United States Patent
Panteleev et al.

(10) Patent No.: US 10,221,372 B2
(45) Date of Patent: Mar. 5, 2019

(54) BIOFUEL COMPOSITION

(71) Applicant: LIMITED LIABILITY COMPANY RECYCLE, Perm (RU)

(72) Inventors: Evgenii Valentinovich Panteleev, Perm (RU); Pavel Evgenievich Panteleev, Perm (RU); Galina Viktorovna Panteleeva, Perm (RU)

(73) Assignees: Limited Liability Company Recycle, Perm (RU); Evgeniy Valentinovich Panteleev, Perm (RU); Pavel Evgenevich Patneleev, Perm (RU); Galina Viktorovna Panteleeva, Perm (RU)

( * ) Notice: Subject to any disclaimer, the term of this patent is extended or adjusted under 35 U.S.C. 154(b) by 10 days.

(21) Appl. No.: 15/127,843

(22) PCT Filed: May 21, 2014

(86) PCT No.: PCT/RU2014/000364
§ 371 (c)(1),
(2) Date: Sep. 21, 2016

(87) PCT Pub. No.: WO2015/142211
PCT Pub. Date: Sep. 24, 2015

(65) Prior Publication Data
US 2017/0107437 A1    Apr. 20, 2017

(30) Foreign Application Priority Data
Mar. 21, 2014   (RU) ................................ 2014110978

(51) Int. Cl.
| | | |
|---|---|---|
| *C10L 10/16* | (2006.01) |
| *C10L 1/185* | (2006.01) |
| *C10L 1/02* | (2006.01) |
| *C10L 10/02* | (2006.01) |
| *C10L 10/12* | (2006.01) |
| *C10L 10/14* | (2006.01) |
| *C10L 1/19* | (2006.01) |

(52) U.S. Cl.
CPC ............... *C10L 10/16* (2013.01); *C10L 1/026* (2013.01); *C10L 1/1852* (2013.01); *C10L 10/02* (2013.01); *C10L 10/12* (2013.01); *C10L 10/14* (2013.01); *C10L 1/191* (2013.01); *C10L 2200/0476* (2013.01); *C10L 2200/0484* (2013.01); *C10L 2270/026* (2013.01); *Y02E 50/13* (2013.01)

(58) Field of Classification Search
CPC combination set(s) only.
See application file for complete search history.

(56) References Cited

U.S. PATENT DOCUMENTS 6,013,114 A    1/2000   Hille et al.

FOREIGN PATENT DOCUMENTS

| RU | 2393209 C2 | 6/2010 |
| RU | 2475472 C2 | 2/2013 |
| WO | 0112581 A1 | 2/2001 |

OTHER PUBLICATIONS

International Search Report with regard to PCT/RU2014/000364 dated Dec. 11, 2014.
"Methanol", Article retrieved from Wikipedia (https://en.wikipedia.org/wiki/Methanol) on Sep. 20, 2016.
"Formaldehyde", Article retrieved from Wikipedia (https://en.wikipedia.org/wiki/formaldehyde) on Sep. 20, 2016.
"Dimethyl Ether", Article retrieved from Wikipedia (https://en.wikipedia.org/wiki/Dimethyl_ether) on Sep. 20, 2016.
Europen Search Report with regard to the counterpart Patent Application 14885929.1 dated Aug. 14, 2017.
Chinese Office Action with regard to the counterpart Patent Application 201480078987.7 dated Oct. 30, 2017.

*Primary Examiner* — Ellen M McAvoy
*Assistant Examiner* — Chantel L Graham
(74) *Attorney, Agent, or Firm* — BCF LLP

(57) ABSTRACT

This invention relates to the fuels, and can be used in the national economy as a motor fuel equivalent by its physical and chemical properties to the oil motor fuel. The technical result of this invention is a biofuel produced, which allows to improve the combustion process efficiency in engine operation, increase engine power and reduce the startup time. In addition, this product can be used to reduce harmful emissions from the engine with significant cost reduction by using components based on low-cost large tonnage products available provided with domestic raw materials, including renewable ones, improve cold flow performance and increase the cetane number. This effect can be achieved by the biofuel as a mixture of dietilformal 40-80 by vol. % and glycerides of unsaturated fatty acids 20-60 by vol. %. Vegetable oils are used as glycerides of unsaturated fatty acids.

3 Claims, No Drawings

BIOFUEL COMPOSITION

CROSS-REFERENCE

The present application claims convention priority to Russian Utility Patent Application No. 2014110978, filed on Mar. 21, 2014, entitled "БИОТОПЛИВНАЯ КОМПОЗИЦИЯ". This application is incorporated by reference herein in its entirety. The present application is a National Phase Entry of International Patent Application no. PCT/RU2014/000364, filed on May 21, 2014, entitled "BIOFUEL COMPOSITION". This application is incorporated by reference herein in its entirety.

FIELD OF THE INVENTION

This invention relates to the fuels, and can be used in the national economy as a motor fuel equivalent by its physical and chemical characteristics to the oil motor fuel.

BACKGROUND OF THE INVENTION

Fuels currently used for diesel engines contain components mainly from crude oil.

Natural gas and dimethyl ether are used as an alternative fuel for diesel engines. The main weakness of such fuels is their poor compatibility with oil diesel, since under normal conditions it generates gases. Furthermore, to operate the vehicle on these alternative fuels it is required its modification. (Dimethyl ether—Wikipedia).

There is a need in high-quality fuel composition for diesel engines containing components of biological origin, and also meeting requirements to diesel fuels quality when operating under any temperature conditions. Moreover, fuel should be environmentally safe. Currently, the most common component of biological origin in the fuels is rapeseed methyl ester, or RME (RU 2393209).

RME weak point is its high viscosity and high pour point, making impossible to use it at sub-zero temperatures. A by-product of RME is glycerin, which can cause some problem in case of a large product output. Esters from other vegetable oils and fatty acid methyl esters can be produced similarly, generally known as FAME (fatty acid methyl ester). Such FAMEs can be used for the same applications as the rapeseed methyl ester, but they also have a negative impact on the diesel fuel quality, particularly on its performance at low temperatures, and furthermore, their use in fuels increases nitrogen oxides emissions. In some cases, FAMEs and RMEs cause higher emission of particles and smoke generation at cold start.

WO 2001012581 (year) application describes a method of methyl esters production used as biological diesel fuel, based on which mixtures of fatty acids and triglycerides are esterified in a single phase. According to this method, a solution from fatty acids, triglycerides, alcohol, acid catalyst and co-solvents is produced at a temperature below the solution boiling point. Co-solvent shall be used in amounts to ensure a single phase, and then solution is allowed to stand for a time sufficient for acid-catalyzed esterification of fatty acids. Thereafter, the acid catalyst is neutralized, alkaline catalyst is added for triglycerides transesterification, and finally esters are thrown out from solution. By doing so, it is possible to obtain biofuel containing esters with glycerin content at least 0.4 wt. %.

The weak point is the process complexity and multi-stage nature, and high product cost.

The most similar to claimed invention is U.S. Pat. No. 6,013,114 patent (taken as a prototype). The fuel with vegetable oil and acetals components is proposed with flashpoint more than +550 C (see clause 5 of the formula).

The disadvantage of this invention is the high product cost. Alcohols (butanol) and higher, which are very expensive, are the raw materials for proposed acetals. Therefore, acetals derived from these alcohols, will also have a high cost. Formals based on C4 alcohols and higher have relatively high viscosity and pour point, and in mixture with vegetable oils cannot be used at low temperatures. Moreover, acetals described in the patent do not relate to renewable bio-products, therefore increase the level of greenhouse gases emissions into the atmosphere.

The object of invention is to develop alternative biofuel not containing oil component, but having a high cetane number, which, along with improved diesel fuel low-temperature and startup properties, inhibits corrosion, is used without engine modification and has an eco-friendly exhaust.

The technical result of invention is combustion process improvement in the engine operation, engine power increase and startup time reduction. In addition, this product can be used to reduce harmful engine emissions along with significant cost reduction by using components based on low-cost large tonnage products available provided with the domestic raw materials, including renewable ones, cold flow performance improvement and cetane number increase.

Said effect can be achieved by the biofuel containing dietilformal 40-80 by vol. % and glycerides of unsaturated fatty acids 20-60 by vol. %. Any vegetable oils are used as glycerides of unsaturated fatty acids.

Dietilformal used can increase diesel fuel cetane number to 60 points. Bioethanol (raw materials of lower cost) is a raw material for dietilformal synthesis, allowing to reduce the products cost.

In addition, dietilformal physical and chemical parameters exceed dibutilformal, allowing to produce biodiesel fuel with a pour point lower than −600 C.

DETAILED DESCRIPTION

It is known that Diesel tested his engine on a vegetable oil. However, vegetable oil has a high viscosity and high pour point, therefore oil methyl esters are mainly used worldwide. 30% of costs account for oils transesterification process, wherein the alkali is used and by-products are generated.

In joint use (simple mixture) of dietilformal and glycerides of unsaturated fatty acids, 11 parameters of European standard EN 14214 for biodiesel are improved.

Dietilformal is a biofuel that can be easily produced from bioethanol and biogas, renewable energy sources by known methods of ethanol and formaldehyde condensation (Himik.ru Chemical Encyclopaedia) and formaldehyde from methane through the methanol (ru.wikipedia.org Methanol and Formaldehyde).

Dietilformal use in a mixture of glycerides of unsaturated fatty acids, for which vegetable oils are used in amount of 20-60 by vol. %, allows to produce biofuel with a high cetane number and characteristics corresponding to the Russian standard GOST R53605-2009, European standard EN 14214-2003 and US standard ASTMD 6751. In this case the need in transesterification of oils with methanol is eliminated, which accounts for 30% of costs and the need in by-products disposal—glycerine and alkaline catalyst waste is also eliminated (Marketing research of the biofuel market, Bioethanol and Biodiesel, May 18, 2012 Research Techart, p. 54). A fuller use of plant and renewable raw materials has a beneficial effect on environment as a whole.

We have previously shown that with DEP concentration more than 40%, all vegetable oils (corn, linseed, rapeseed and palm) satisfy by their viscosity parameter standards and viscosity below 5 cCm.

Tests were carried out on Toyota Carina E (1994 release) with diesel two-liter engine at a temperature below −200 C. 100% biodiesel fuel was filled in the empty tank in amount of 20 liters and the vehicle has been operated for several days. Tests were carried out on three samples of biodiesel fuel containing 40-80% of dietilformal (DEF) and 20-60% of sunflower oil. The results are shown in Table below.

| Parameter | 40% of DEF, 60% of sunflower oil | 60% of DEF, 40% of sunflower oil | 80% of DEF, 20% of sunflower oil |
| --- | --- | --- | --- |
| 1. Density at 15° C., g/cm$^3$ | 0.894 | 0.878 | 0.862 |
| 2. Viscosity at 40° C., cCm | 4.32 | 2.0 | 1.02 |
| 3. Pour point, ° C. | −48 | −60 | −62 |

CONCLUSIONS

The vehicle properly operates on all tested samples without any significant deviations. With dietilformal concentration below 40%, viscosity index does not satisfy the standards—more than 5 cCm, and with dietilformal concentration greater than 80%, wetting ability (gliding) decreases and heating value of biodiesel fuel reduces.

The invention claimed is:

1. A biodiesel fuel containing acetals and vegetable oils, wherein the biodiesel fuel is a mixture of dietilformal of 40-80 by vol. % and glycerides of unsaturated fatty acids 20-60 by vol. %; and wherein the biodiesel fuel exhibits one or more of the following parameters: i) a density at 15° C. ranging between about 0.86 g/cm$^3$ and about 0.89 g/cm$^3$; ii) a viscosity at 40° C. ranging from between about 1.0 cCm and about 4.3 cCm; and iii) a pour point ranging from about −48° C. and about −62° C.

2. The biodiesel fuel according claim 1, wherein the dietilformal is used as acetals.

3. The biodiesel fuel according to claim 1, wherein the vegetable oils are used as glycerides of unsaturated fatty acids.

* * * * *